United States Patent
Jung et al.

(10) Patent No.: US 8,902,502 B2
(45) Date of Patent: Dec. 2, 2014

(54) STEREOSCOPIC IMAGE DISPLAY APPARATUS AND METHOD OF DRIVING THE SAME

(75) Inventors: Sungmin Jung, Incheon (KR); Hyungju Park, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 266 days.

(21) Appl. No.: 12/938,919

(22) Filed: Nov. 3, 2010

(65) Prior Publication Data

US 2011/0116166 A1 May 19, 2011

(30) Foreign Application Priority Data

Nov. 18, 2009 (KR) .................. 10-2009-0111623

(51) Int. Cl.
| | |
|---|---|
| *G02B 27/26* | (2006.01) |
| *G09G 3/00* | (2006.01) |
| *G09G 3/36* | (2006.01) |
| *H04N 13/04* | (2006.01) |

(52) U.S. Cl.
CPC ............. *G02B 27/26* (2013.01); *G09G 3/003* (2013.01); *G09G 3/3659* (2013.01); *H04N 13/0438* (2013.01); *H04N 13/0486* (2013.01); *G09G 2300/0814* (2013.01); *G09G 2300/0842* (2013.01); *G09G 2310/0251* (2013.01)
USPC .......................................... 359/465; 359/464

(58) Field of Classification Search
USPC ........... 359/461–465; 349/15; 348/53, 55, 56, 348/58, 43
See application file for complete search history.

(56) References Cited

U.S. PATENT DOCUMENTS

| | | | | |
|---|---|---|---|---|
| 6,456,432 | B1* | 9/2002 | Lazzaro et al. ............... | 359/464 |
| 8,520,038 | B2* | 8/2013 | Nobori ........................ | 345/690 |
| 8,654,183 | B2* | 2/2014 | Jung et al. .................. | 348/51 |
| 8,659,641 | B2* | 2/2014 | Brigham et al. .............. | 348/42 |
| 2005/0088386 | A1 | 4/2005 | Kao et al. | |
| 2006/0126177 | A1* | 6/2006 | Kim et al. .................... | 359/465 |
| 2007/0018927 | A1* | 1/2007 | Kim ............................. | 345/92 |
| 2009/0168164 | A1* | 7/2009 | Kean et al. .................. | 359/463 |
| 2010/0302634 | A1* | 12/2010 | Jung ............................ | 359/465 |

FOREIGN PATENT DOCUMENTS

| | | |
|---|---|---|
| CN | 101222648 A | 7/2008 |
| CN | 101408679 A | 4/2009 |
| CN | 201293899 Y | 8/2009 |
| KR | 10-2009-0066935 * | 7/2009 |

OTHER PUBLICATIONS

Office Action issued in corresponding Chinese Patent Application No. 201010501392.1, mailed Jun. 28, 2012.
Office Action issued in corresponding German Patent Application No. 102010037882.8, mailed Dec. 7, 2011.
Pastoor et al., "3-D Displays: A Review of Current Technologies" Displays, vol. 17, 1997.
Woods et al., "The Compatibility of LCD TVs with Time-Sequential Stereoscopic 3D Visualization" Proceedings of the SPIE—The International Society for Optical Engineering, vol. 7237, 2009.

* cited by examiner

Primary Examiner — William Choi
Assistant Examiner — Sharrief Broome
(74) Attorney, Agent, or Firm — Brinks Gilson & Lione

(57) ABSTRACT

An embodiment of the present invention provides a stereoscopic image displaying apparatus comprising a displaying panel that receives image data displaying an image and black data displaying no image for each frame section, and a polarization control panel that is located over the displaying panel and changes a polarization state.

11 Claims, 7 Drawing Sheets

(a)                      (b)

STEREOSCOPIC IMAGE DISPLAY APPARATUS AND METHOD OF DRIVING THE SAME

This application claims the benefit of Korea Patent Application No. 10-2009-0111623, filed on Nov. 18, 2009, the entire contents of which is incorporated herein by reference for all purposes as if fully set forth herein.

BACKGROUND

1. Field of the Invention

This document relates to a stereoscopic image displaying apparatus and a method of driving the stereoscopic image displaying apparatus.

2. Discussion of the Related Art

Stereoscopic image displaying apparatuses may be classified into stereoscopic technique-based apparatuses and autostereoscopic technique-based apparatuses.

The stereoscopic technique-based apparatus use binocular disparity between the left and right eyes and have a large three-dimensional effect. The stereoscopic technique-based apparatus include glasses type and non-glasses type, both of which are currently commercially available. In a glasses type device, left and right images having different polarization directions are displayed on a direct view type displaying panel or projector, or left and right images are displayed on the direct view type displaying panel or projector in a time-split manner. The left and right images can be seen by use of polarization glasses or liquid crystal shutter glasses. In a non-glasses type device, an optical plate, such as parallax barrier, is generally provided at the front or rear side of a displaying panel to separate the optical axes of left and right images.

The glasses type device includes a polarization control panel, such as a retarder, between a displaying panel and polarization glasses to change polarization characteristics of light. The glasses type device alternately displays a left eye image and a right eye image on the displaying panel, and changes polarization characteristics of light incident on the polarization glasses through the polarization control panel. Accordingly, since the glasses type device can display the left eye image and the right eye image in a time-split manner, a stereoscopic image may be implemented without a lowering in resolution.

In the related art glasses type stereoscopic image displaying apparatus, image frame data are supplied to the displaying panel through one gate line, and this increases a coupling region between the displaying panel and the polarization control panel. Accordingly, a difference in transmissivity occurs between the left eye image and the right eye image. Further, crosstalk occurs at at least one of the left eye image and the right eye image due to increase in an intersecting section between the displaying panel and the polarization control panel.

Accordingly, there is a need for a stereoscopic image displaying apparatus that may prevent crosstalk from occurring between the left eye image and the right eye image to provide a stressed stereoscopic feeling.

BRIEF SUMMARY

According to an embodiment of the present invention, there is provided a stereoscopic image displaying apparatus comprising: a displaying panel that receives image data displaying an image and black data displaying no image for each frame section; and a polarization control panel that is located over the displaying panel and changes a polarization state.

According to an embodiment of the present invention, there is provided a method of driving a stereoscopic image displaying apparatus comprising a displaying panel that displays a left eye image and a right eye image for each frame section, and a polarization control panel that is located over the displaying panel and changes a polarization state, the method comprising: supplying image data displaying an image on the displaying panel and black data displaying no image on the displaying panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Hereinafter, embodiments of the present invention will be described with reference to the accompanying drawings.

Figure 1:
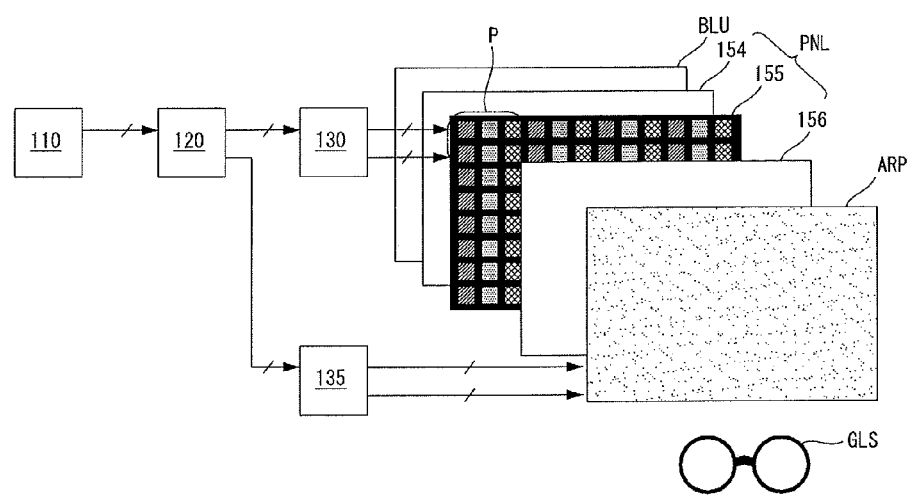
FIG. 1 is a view schematically illustrating a stereoscopic image displaying apparatus according to an embodiment of the present invention.
Figure 2:
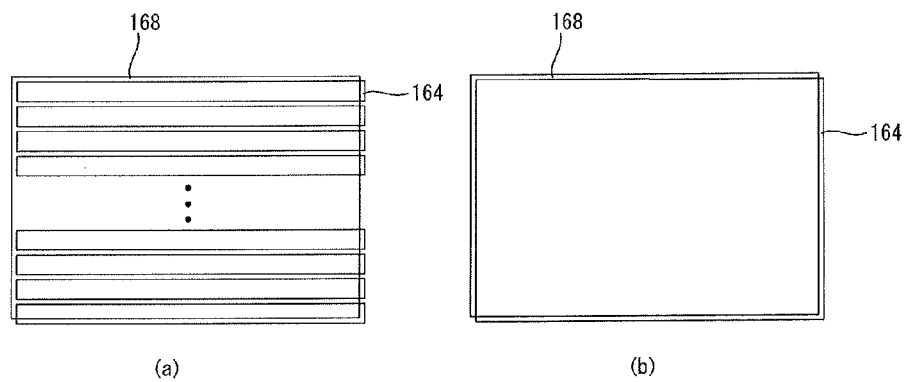
FIG. 2 is a view illustrating electrodes included in a polarization control panel shown in FIG. 1.

FIG. 1 is a view schematically illustrating a stereoscopic image displaying apparatus according to an embodiment of the present invention and FIG. 2 is a view illustrating electrodes included in a polarization control panel shown in FIG. 1.

Referring to FIGS. 1 and 2, a stereoscopic image displaying apparatus includes an image supplier 110, a controller 120, a fist driver 130, a second driver 135, a displaying panel PNL, a polarization control panel ARP, and polarization glasses GLS.

The image supplier 110 supplies the controller 120 with a 2D format of image frame data in a two-dimensional (2D) mode and a 3D format of image frame data in a three-dimensional (3D) mode. Further, the image supplier 110 supplies the controller 120 with timing signals including a vertical sync. signal Vsync, a horizontal sync. signal Hsync, a data enable signal DE, a main clock, and a low potential voltage GND. The image supplier 110 selects 2D mode or 3D mode according to user's selection received through a user interface. The user interface includes a user inputting means, such as an on-screen display (OSD), a remote controller, a keyboard, and a mouse.

The controller 120 supplies the displaying panel PNL with image data displaying an image and black data displaying no image for each frame section. The image data may be selected as left eye image data and right eye image data. The black data is located between the left eye image data and the right eye image data. The controller 120 supplies the image data inputted from the image supplier 110 to the fist driver 130 at a frame frequency of 60×n (n is two or more positive integer) Hz, for example, 120 Hz. The controller 120 alternately supplies the fist driver 130 with the left eye image data and the right eye image data in the 3D mode. Further, the controller 120 multiplies the frame frequency of an inputted image by n times to increase the frequency of a timing control signal for controlling the operation timings of the fist driver 130 and the second driver 135. Further, the controller 120 controls the second driver 135 to vary from a first driving voltage to a second driving voltage the voltages of scan lines 164 formed on the polarization control panel ARP along the lines on which the left eye image and the right eye image are changed on the displaying panel PNL.

The fist driver 130 includes a data driving circuit connected to data lines and a gate driving circuit connected to gate lines. Under control of the controller 120, the fist driver 130 converts digital image data inputted from the controller 120 into positive/negative analogue image data and supplies the converted analogue data to the data lines. The fist driver 130 sequentially supplies a gate signal (or a scan signal) to the gate lines under control of the controller 120.

The second driver 135 shifts switching voltages Von/Voff supplied to the scan lines 164 along a boundary between the left eye image data and the right eye image data displayed on the displaying panel PNL. The second driver 135 may be implemented as a multiplexer array that, under control of the controller 120, selects the voltage Voff synchronized with the left eye image data displayed on the displaying panel PNL and the voltages +Von/−Von synchronized with the right eye frame data displayed on the displaying panel PNL. The second driver 135 may be implemented as a shift register or a level shifter that shifts an output from the shift register to the voltages Voff and +Von/−Von, or as an analogue/digital circuit that may sequentially supply the voltages Voff and +Von/−Von to the scan lines 164 of the polarization control panel ARP.

The displaying panel PNL displays a left eye image and a right eye image for each frame section corresponding to the image data and the black data supplied from the fist driver 130. The displaying panel PNL may be implemented as a liquid crystal display (LCD) panel 155 or an organic light emitting diode (OLED) panel. In this embodiment, an LCD panel 155 is described as an example. The LCD panel 155 includes a thin film transistor (TFT) substrate and a color filter substrate. A liquid crystal layer is interposed between the TFT substrate and the color filter substrate. Data lines and gate lines are formed on the TFT substrate to intersect each other. Sub-pixels are formed in a matrix form near intersections of the data lines and the gate lines. The sub-pixels are constituted so that at least two switching transistors receive the image data and the black data in response to at least two gate signals.

The color filter substrate includes black matrixes and color filters. Polarization plates 154 and 156 are attached on the color filter substrate and the TFT substrate of the LCD panel 155. Further, an alignment layer is formed on the LCD panel 155 to set pre-tilt angles of liquid crystal molecules. The upper polarization plate 156 has an optical absorption axis that conforms with an optical absorption axis of a polarization filter for left eye included in the polarization glasses GLS and determines polarization characteristics of light incident onto the polarization control panel ARP based on the optical absorption axis. The lower polarization plate 154 determines polarization characteristics of light incident onto the LCD panel 155. A spacer is formed between the color filter substrate and the TFT substrate of the LCD panel 155 to maintain a cell gap of the liquid crystal layer. LCD panel 155 may be implemented to have any liquid crystal mode including a twisted nematic (TN) mode, a vertical alignment (VA) mode, in-plane switching (IPS) mode, or a fringe field switching (FFS) mode. The LCD panel 155 receives light from a backlight unit 151 to emit linearly polarized or circularly polarized light.

The polarization control panel ARP is located over the displaying panel PNL and converts the polarization states to be orthogonal to each other for each frame section. The polarization control panel ARP converts light from the displaying panel PNL into first polarized light in response to a first driving voltage during an nth frame section and converts light from the displaying panel PNL into second polarized light in response to a second driving voltage during an n+1th frame section. The polarization control panel ARP may be driven in synchronization with the displaying panel PNL. As an example, the polarization control panel ARP may include an upper transparent substrate and a lower transparent substrate that face each other, with the liquid crystal layer located between the upper transparent substrate and the lower transparent substrate. As shown in FIG. 2A, a common electrode 168 is formed on the upper transparent substrate of the polarization control panel ARP and the scan lines 164 are formed of divided stripes on the lower transparent substrate of the polarization control panel ARP. The common electrode 168 and the scan line 164 may also be formed to have the same shape as shown in FIG. 2B. When the polarization control panel ARP has the electrode structure as shown in FIG. 2A, the scan lines 164 formed on the polarization control panel ARP are divided and arranged in the same direction as that of the gate lines formed on the displaying panel PNL. The scan lines 164 formed on the polarization control panel ARP have a relationship of a 1:N correspondence (N is an even number) with the gate lines formed on the displaying panel PNL. For example, when the displaying panel PNL has 1,080 gate lines and the polarization control panel ARP has 90 scan lines 164, one scan line corresponds to twelve gate lines. The liquid crystal layer located between the upper transparent substrate and the upper transparent substrate includes a TN having a waveguide, an electrically controlled birefringence (ECB) having a half wave (λ/2) plate, a VA having a half wave plate, a hybrid aligned nematic having a half wave plate, and an optically compensated bend (OCB) having a half wave plate. A common voltage that has the same potential as that of a common voltage applied to a common electrode of the displaying panel PNL is applied to the common electrode 168. A voltage Voff that has the same potential as that of the common voltage is supplied to the scan lines 164 before (or after) the right eye frame image (or left eye frame image) is displayed at the lines opposite to the scan lines 164 on the displaying panel PNL. Positive/negative voltages +Von/−Von that have a predetermined voltage difference from the common voltage are alternately supplied to the scan lines 164 before (or after) the left eye frame image (or right eye frame image) is displayed at the lines opposite to the scan lines 164 on the displaying panel PNL. Accordingly, switching on/off voltages with three-step voltage levels are supplied to the scan lines 164 so that the left eye image or right eye image displayed on the displaying panel PNL can be viewed through the polarization glasses GLS. The voltages +Von/−Von that are generated as a positive voltage and a negative voltage with respect to the common voltage prevent the liquid crystal from being deteriorated due to a DC voltage.

An image displayed on the polarization control panel ARP can be seen through the polarization glasses GLS. The polarization glasses GLS include a left eye glass and a right eye glass that have different optical absorption axes so that the left eye glass has different polarization characteristics from those of the right eye glass. The polarization glasses GLS may be variously implemented according to the polarization characteristics of the displaying panel PNL and the polarization control panel ARP.

A stereoscopic image displaying apparatus according to an embodiment of the present invention will now be described in greater detail.

Figure 3:
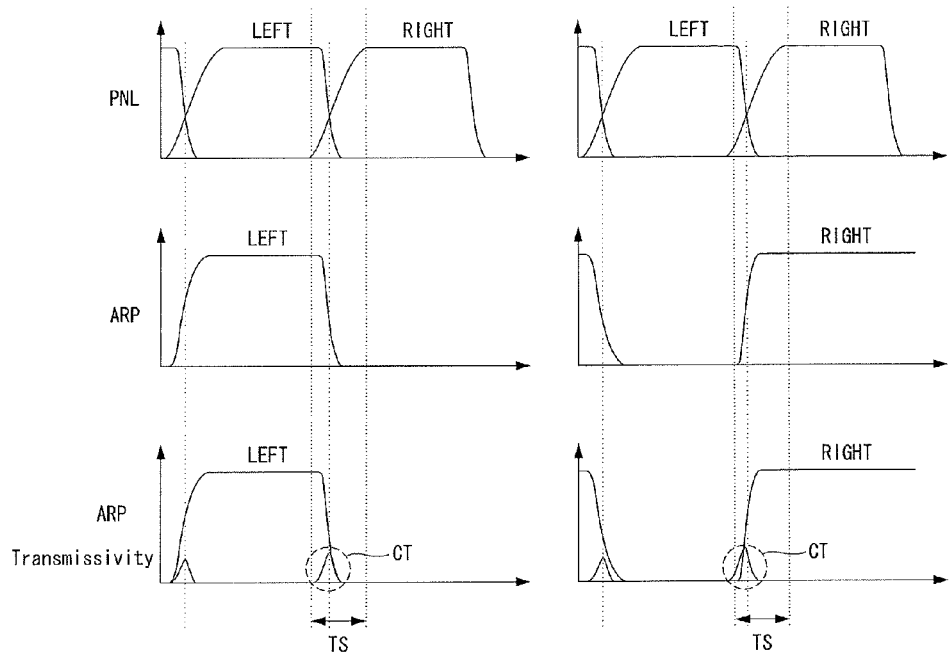
FIG. 3 is a waveform diagram illustrating the occurrence of a light leaking section upon driving a related art stereoscopic image displaying apparatus.
Figure 4:
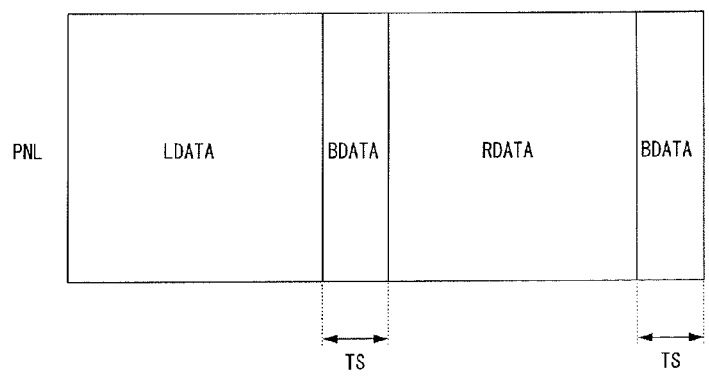
FIGS. 4 and 5 are waveform diagrams illustrating data supplied to a displaying panel according to an embodiment of the present invention.
Figure 5:
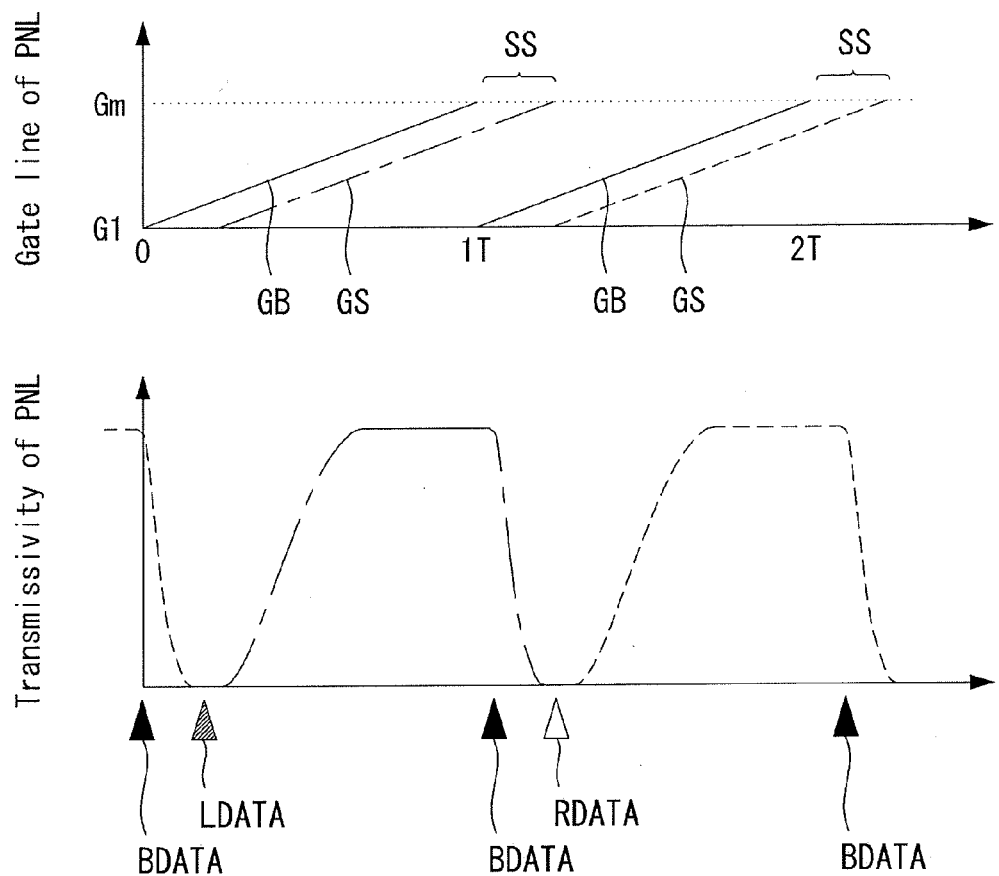
Figure 6:
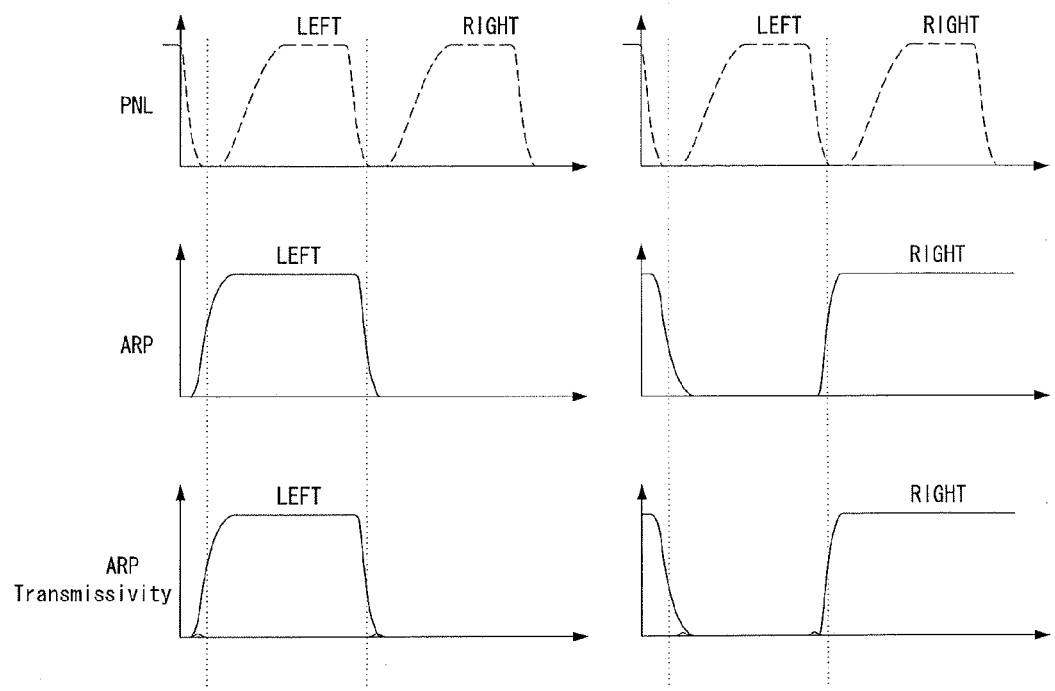
FIG. 6 is a waveform diagram illustrating that a light leaking section is eliminated upon driving a stereoscopic image displaying apparatus according to an embodiment of the present invention.

FIG. 3 is a waveform diagram illustrating the occurrence of a light leaking section upon driving a related art stereoscopic image displaying apparatus, FIGS. 4 and 5 are waveform diagrams illustrating data supplied to a displaying panel according to an embodiment of the present invention, and FIG. 6 is a waveform diagram illustrating that a light leaking section is eliminated upon driving a stereoscopic image displaying apparatus according to an embodiment of the present invention.

In the related art stereoscopic image displaying apparatus shown in FIG. 3, as an image displayed on the displaying panel PNL is changed, the state of polarization of the polarization control panel ARP is also changed. For example, when an image displayed on the displaying panel PNL is changed from a left eye image (LEFT) to a right eye image (RIGHT), the state of polarization of the polarization control panel ARP is also changed from left eye polarization (LEFT) to right eye polarization (RIGHT). In this case, the polarization control panel ARP of the related art stereoscopic image displaying apparatus can be seen to cause crosstalk (CT) due to light leakage at a section (TS) where the images displayed on the displaying panel PNL intersect each other. For example, when white and black are alternately supplied to the left eye image (LEFT) and the right eye image (RIGHT), the crosstalk (CT) occurring at the polarization control panel ARP of the related art stereoscopic image displaying apparatus may be represented by Equation 1:

$$CT_L = \frac{LB}{LB+LW} \times 100[\%] \qquad \text{[Equation 1]}$$

$$CT_R = \frac{RB}{RB+RW} \times 100[\%]$$

Here, CTL and CTR refer to the amount of crosstalk (CT) occurring at the left eye and right eye of the polarization control panel ARP, respectively, LB and LW refer to the left eye black image and the right eye white image, respectively, and RB and RW refer to the right black image and the right white image, respectively. The crosstalk (CT) may be caused by various causes, such as a coupling between the two images or a failure to completely separate the left eye image and the right eye image from each other due to slow response speed of the polarization control panel ARP. According to an embodiment of the present invention, the following data is supplied to the displaying panel PNL to separate the left eye image and the right eye image from each other.

Image data LDATA and RDATA displaying images on the displaying panel PNL and black data BDATA displaying no image on the intersecting section TS of the images are supplied to the stereoscopic image displaying apparatus according to an embodiment of the present invention, as shown in FIG. 4. For example, when the image data LDATA and RDATA supplied to the displaying panel PNL are changed from the left eye image data LDATA to the right eye image data RDATA, the black data BDATA is positioned between the left eye image data LDATA and the right eye image data RDATA.

As shown in FIG. 5, when the number of the gate lines G1 to Gm of the displaying panel PNL is 1,080, the black data BDATA, the left eye image data LDATA, the black data BDATA, the right eye image data RDATA, and the black data BDATA may be supplied to the displaying panel PNL in this order. The image data LDATA and RDATA and the black data BDATA are supplied to the sub-pixels activated by the gate signals GS and GB supplied through the gate lines G1 to Gm. The gate signals GS and GB have a spaced section SS with a predetermined interval as shown in FIG. 5. The spaced section SS corresponds to the intersecting section TS of images shown in FIG. 4. The gate signals GS and GB include a gate signal GS activating some of the gate lines G1 to Gm for the supply of the image data LDATA and RDATA and a gate signal GB activating some of the gate lines G1 to Gm for the supply of the black data BDATA.

For example, when the gate signals GS and GB are supplied to the displaying panel PNL with the predetermined section SS, for example, with an interval of four scan lines, the gate lines G1 to Gm activated at a time point might have the following order. To distinguish the image data and the black data supplied to the activated gate lines from each other, the gate line corresponding to the image data is denoted as "image (D)" and the gate line corresponding to the black data is denoted as "black (B)".

"Eighth gate line (G8): black (B)->fourth gate line (G4): image (D)->ninth gate line (G9): black (B)->fifth gate line (G5): image (D)->tenth gate line (G10): black (B)->sixth gate line (G6): image (D)->eleventh gate line (G11): black (B)"

The control of the gate lines G1 to Gm and the supply of the image data and the black data in the above manner do not cause any intersections between the images as shown in FIG. 6, and accordingly, this embodiment can fundamentally eliminate light leakage in the section. Thus, according to an embodiment of the present invention, the left eye image (LEFT) and the right eye image (RIGHT) may be clearly separated from each other on the displaying panel PNL, so that crosstalk (CT) between the displaying panel PNL and the polarization control panel ARP may be prevented.

A construction of a sub-pixel will now be described according to an embodiment of the present invention.

Figure 7:
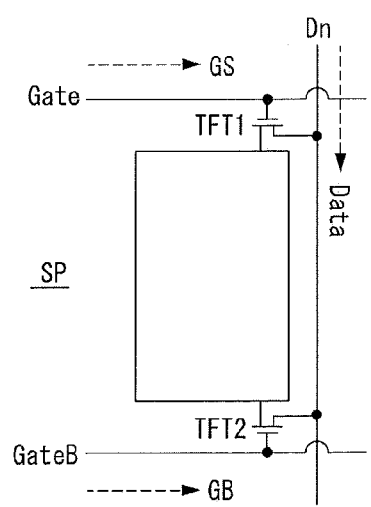
FIGS. 7 and 8 are views illustrating a sub-pixel according to an embodiment of the present invention.
Figure 8:
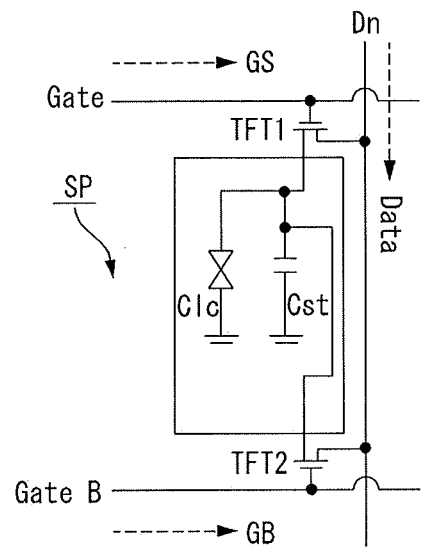
Figure 9:
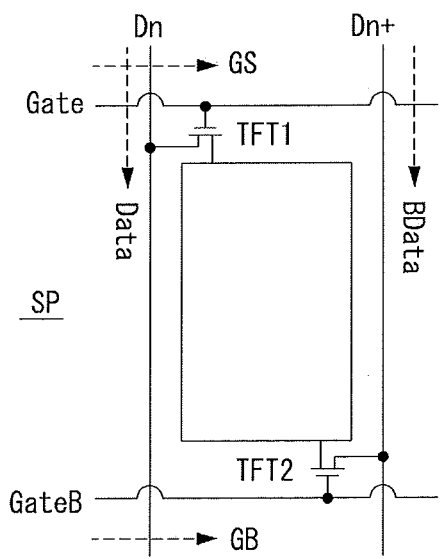
FIGS. 9 and 10 are views illustrating a sub-pixel according to an embodiment of the present invention.
Figure 10:
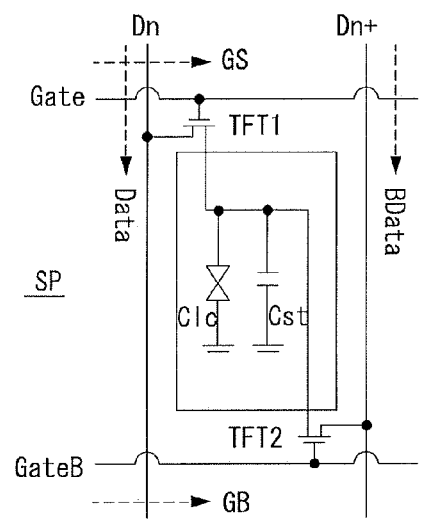
Figure 11:
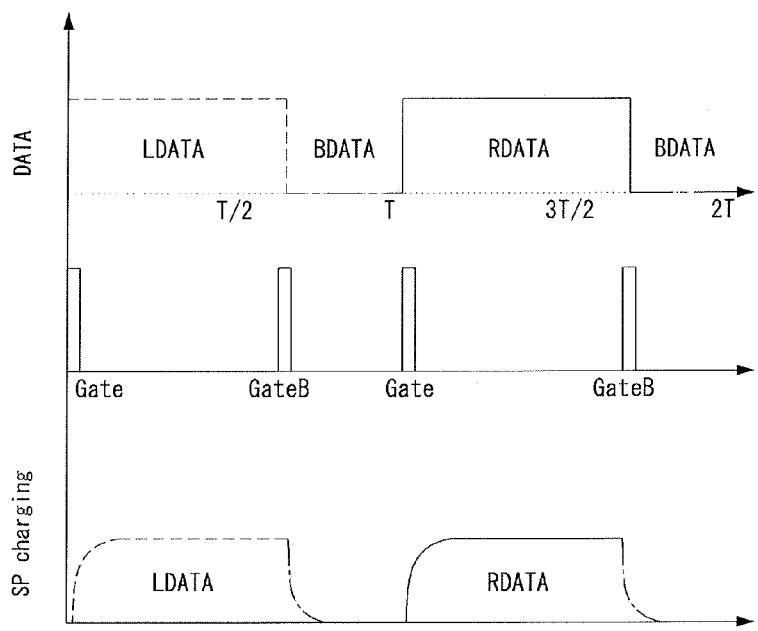
FIG. 11 is a view illustrating an exemplary driving waveform according to an embodiment of the present invention.
Figure 12:
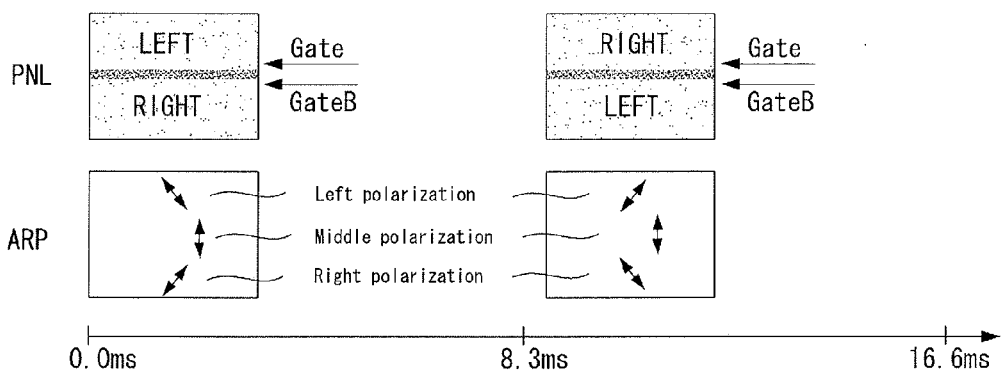
FIG. 12 is a view illustrating an operational state of a stereoscopic image displaying apparatus according to an embodiment of the present invention.
Figure 13:
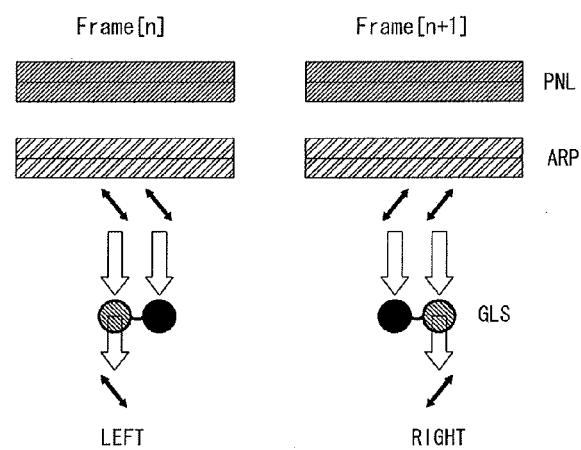
FIG. 13 is a view illustrating an operation of a stereoscopic image displaying apparatus according to an embodiment of the present invention.

FIGS. 7 and 8 are views illustrating a sub-pixel according to an embodiment of the present invention. FIGS. 9 and 10 are views illustrating a sub-pixel according to an embodiment of the present invention. FIG. 11 is a view illustrating an exemplary driving waveform according to an embodiment of the present invention. FIG. 12 is a view illustrating an operational state of a stereoscopic image displaying apparatus according to an embodiment of the present invention. FIG. 13 is a view illustrating an operation of a stereoscopic image displaying apparatus according to an embodiment of the present invention.

Referring to FIG. 7, a sub-pixel SP according to an embodiment of the present invention includes a first switching transistor TFT1 responsive to a first gate signal GS supplied to a first gate line Gate so that the image data DATA is supplied through a data line Dn, and a second switching transistor TFT2 responsive to a second gate signal GB supplied to a second gate line GateB so that the black data BDATA is supplied through the data line Dn. The first switching transistor TFT1 included in the sub-pixel SP stores the image data DATA supplied through the data line Dn in response to the first gate signal GS supplied to the first gate line Gate. Here, the image data DATA refers to the left eye image data or the right eye image data as described above. The second switching transistor TFT2 included in the sub-pixel SP stores the black data BDATA supplied through the data line Dn in response to the second gate signal GB supplied to the second gate line GateB.

Referring to FIG. 8, the image data DATA or black data BDATA supplied through the data line Dn are stored in a storage capacitor Cst. Although the first switching transistor TFT1 and the second switching transistor TFT2 included in the sub-pixel SP share one storage capacitor Cst in this embodiment, the present invention is not limited thereto. A liquid crystal cell Clc displays an image or no image according to the data stored in the storage capacitor Cst.

Referring to FIG. 9, a sub-pixel according to an embodiment of the present invention may include a first switching transistor TFT1 responsive to a first gate signal GS supplied to a first gate line Gate so that the image data DATA is supplied through a first data line Dn, and a second switching transistor TFT2 responsive to a second gate signal GB supplied to a second gate line GateB so that the black data BDATA is supplied through a second data line Dn+. The first switching transistor TFT1 included in the sub-pixel SP stores the image data DATA supplied through the first data line Dn in response to the first gate signal GS supplied to the first gate line Gate. Here, the image data DATA refers to the left eye image data or the right eye image data as described above. The second switching transistor TFT2 included in the sub-pixel SP stores the black data BDATA supplied through the second data line Dn+ in response to the second gate signal GB supplied to the second gate line GateB.

Referring to FIG. 10, the image data DATA and the black data BDATA supplied through the first and second data lines Dn and Dn+ are stored in a storage capacitor Cst. Although the first switching transistor TFT1 and the second switching transistor TFT2 included in the sub-pixel SP share one storage capacitor Cst in this embodiment, the present invention is not limited thereto. A liquid crystal cell Clc displays an image or no image according to the data stored in the storage capacitor Cst.

In the case of the sub-pixel SP according to the embodiment described in connection with FIGS. 7 and 8, two switching transistors, such as the first and second switching transistors TFT1 and TFT2, share one data line, such as the data line Dn. Accordingly, upon supplying the data, the sub-pixel SP according to the embodiment described in connection with FIGS. 7 and 8 may require frequency clocks faster by at least two times or more than the sub-pixel SP according to the embodiment described in connection with FIGS. 9 and 10. Further, in the case of the sub-pixel SP according to the embodiment described in connection with FIGS. 7 and 8, the data supplied through the data line Dn may require a signal output characteristic that has an order of the left eye image data, the black data, the right eye image data, and the black data. The sub-pixel SP according to the embodiment described in connection with FIGS. 9 and 10 does not require such a signal output characteristic having the order since the data are supplied through the two data lines Dn and Dn+.

As shown in FIGS. 7 to 11, a method of driving a stereoscopic image displaying apparatus according to an embodiment of the present invention supplies the image data LDATA and RDATA displaying an image on the displaying panel PNL and the black data BDATA displaying no image on the displaying panel PNL.

Accordingly, the sub-pixel SP receives the left eye image data LDATA, the black data BDATA, the right eye image data RDATA, and the black data BDATA by the gate signals GS and GB supplied through at least two gate lines Gate and GateB. The image data DATA may be supplied while the first gate line Gate is activated and the black data BDATA may be supplied while the second gate line GateB is activated before one frame is ended. The data (SP charging) charged to the sub-pixel SP by the data LDATA, RDATA, and BDATA may be as shown in FIG. 11.

When the image data DATA and the black data BDATA are supplied to the sub-pixel SP in the above manner, the displaying panel PNL and the polarization control panel ARP may have the state as shown in FIG. 12. The interval between a time that the second gate line GateB is activated (gate-on time) and the predetermined section SS during which the image data DATA is supplied may be in the range of 1 ms to 3 ms. However, the interval is not limited thereto, but may vary depending on, for example, the size of the displaying panel PNL.

Referring to FIG. 12, a section during which the black data BDATA is supplied to the sub-pixel SP corresponds to the intersecting section TS of images on the displaying panel PNL and a middle polarization section of the polarization control panel ARP. Accordingly, the section during which the BDATA is supplied corresponds to the middle polarization section during which the polarization control panel ARP is changed from left eye polarization to right eye polarization and vice versa. A stereoscopic image displaying apparatus according to an embodiment is driven as described below.

As shown in FIGS. 7 to 13, the displaying panel PNL displays the left eye image LEFT during a nth frame section (Frame[n]) and the right eye image RIGHT during an n+1th frame section (Frame[n+1]). In synchronization with the displaying panel PNL, the polarization state of the polarization control panel ARP is changed to a left eye polarization state during the nth frame section (Frame[n]) and to a right eye polarization state during the n+1th frame section (Frame[n+1]).

Light leakage is eliminated by the black data BDATA supplied during the intersecting section of the left eye image LEFT and the right eye image RIGHT on the displaying panel PNL. Accordingly, an embodiment of the present invention may clearly separate the left eye image LEFT and the right eye image RIGHT displayed on the displaying panel PNL from each other, thus eliminating the effects of crosstalk CT.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A stereoscopic image displaying apparatus comprising:
   a displaying panel that receives image data displaying an image and black data displaying no image for each frame section; and
   a polarization control panel that is located over the displaying panel and changes a polarization state,
   wherein the image data includes left eye image data and right eye image data, wherein the black data is positioned between left eye image data and right eye image data,
   the displaying panel displays the left eye image data during a nth frame section, n is a natural number, and the right eye image data during an n+1th frame section,
   in synchronization with the displaying panel, the polarization state of the polarization control panel is changed to a left eye polarization state during the nth frame section and to a right eye polarization state during the n+1th frame section, and
   the black data is supplied during the intersecting section between adjacent two frame sections such that the left eye image data, the black data, and the right eye image data are displayed in succession.

2. The stereoscopic image displaying apparatus of claim 1, wherein
   the black data is positioned at a middle polarization section during which the polarization control panel is changed from left eye polarization to right eye polarization or from the right eye polarization to the left eye polarization.

3. The stereoscopic image displaying apparatus of claim 1, wherein the displaying panel includes sub-pixels, wherein each sub-pixel includes at least two switching transistors that receive the image data and the black data in response to at least two gate signals.

4. The stereoscopic image displaying apparatus of claim 1, wherein
   the displaying panel includes sub-pixels, wherein each sub-pixel includes,
      a first switching transistor responsive to a first gate signal supplied to a first gate line so that the image data is supplied through a data line, and
      a second switching transistor responsive to a second gate signal supplied to a second gate line so that the black data is supplied through the data line.

5. The stereoscopic image displaying apparatus of claim 1, wherein
   the displaying panel includes sub-pixels, wherein each sub-pixel includes,
      a first switching transistor responsive to a first gate signal supplied to a first gate line so that the image data is supplied through a first data line, and
      a second switching transistor responsive to a second gate signal supplied to a second gate line so that the black data is supplied through a second data line.

6. The stereoscopic image displaying apparatus of claim 1, wherein the polarization control panel includes,
   scan lines that are formed on an upper transparent substrate and separated in stripes, and
   a common electrode that is formed on a lower transparent substrate and overlaps the scan lines.

7. The stereoscopic image displaying apparatus of claim 1, wherein
   the polarization control panel includes,
   a scan line that is formed on an upper transparent substrate, and
   a common electrode that is formed on a lower transparent substrate and has the same shape as that of the scan line.

8. The stereoscopic image displaying apparatus of claim 1, further comprising:
   polarization glasses that separate an image displayed on the polarization control panel into a left eye image and a right eye image.

9. A method of driving a stereoscopic image displaying apparatus comprising a displaying panel that displays a left eye image and a right eye image for each frame section, and a polarization control panel that is located over the displaying panel, the method comprising:
   supplying image data displaying an image on the displaying panel and black data displaying no image on the displaying panel to the displaying panel; and
   changing a polarization state of the polarization control panel,
   wherein the black data is positioned between left eye image data representing the left eye image and right eye image data representing the right eye image,
   the displaying panel displays the left eye image data during a nth frame section, n is a natural number, and the right eye image data during an n+1th frame section,
   in synchronization with the displaying panel, the polarization state of the polarization control panel is changed to a left eye polarization state during the nth frame section and to a right eye polarization state during the n+1th frame section, and
   the black data is supplied during the intersecting section between adjacent two frame sections such that the left eye image data, the black data, and the right eye image data are displayed in succession.

10. The method of claim 9, wherein
    the black data is positioned at a middle polarization section during which the polarization control panel is changed from left eye polarization to right eye polarization or from the right eye polarization to the left eye polarization.

11. The method of claim 9, wherein
    the black data is supplied corresponding to a middle polarization section of the polarization control panel.

* * * * *